May 3, 1966  J. ALBERANI ETAL  3,249,145

DYNAMIC LOAD COMPENSATING VALVE

Filed April 3, 1964

JULIUS ALBERANI
RONALD J. SAVAGE
INVENTORS

BY
ATTORNEY

3,249,145
DYNAMIC LOAD COMPENSATING VALVE
Julius Alberani, Warren, and Ronald J. Savage, Birmingham, Mich., assignors to Holley Carburetor Company, Warren, Mich., a corporation of Michigan
Filed Apr. 3, 1964, Ser. No. 357,150
1 Claim. (Cl. 158—36.5)

This invention relates generally to combined flow and pressure regulators, and more particularly to a valve for eliminating the effect of dynamic or "G" loading on fluel flowing through a moving conduit.

In certain gas turbine engine applications, such as ground-to-air missiles, the engine is started and brought up to maximum speed on the ground by the use of auxiliary equipment that is disconnected before the missile is launched. The missile fuel system may be very simple, as compared to the auxiliary equipment; for example, it may comprise merely a pressurized fuel tank mounted near the front of the engine and an inexpensive, slow reacting, pressure responsive governor located just upstream of the nozzle that discharges fuel into the engine burner chamber which is at ambient pressure. While it is desired to maintain the fuel flow to the engine constant once the missile is launched, the missile is accelerated throughout its mission and any "G" loading in fuel lines parallel to the direction of flight causes an excessive fuel supply that may cause the engine to overspeed or overheat.

Accordingly, it is a primary object of the invention to provide a valve which may be inserted in the conduit communicating between the source of fuel and the discharge nozzles which automatically eliminates the "G" loading effect on the fuel wihch is flowing through the conduit.

A further object of the invention is to provide such a valve which maintains both the fuel flow and the pressure immediately upstream of the nozzles constant.

Still another object of the invention is to provide such a valve which is compact and light-weight, efficient and reliable, and inexpensive and easy to manufacture.

A still further object of the invention is to provide such a valve and associated resilient means having provisions for cancelling out the effect of increased spring force on the valve resulting from compression of the resilient means.

Other more specific objects and advantages of the invention will become more apparent when reference is made to the following specification and the accompanying drawings wherein.

Figure 1:
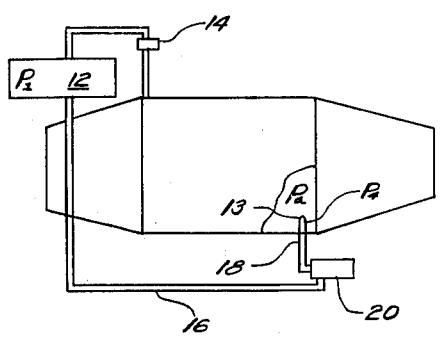
FIGURE 1 is a schematic illustration of a gas turbine engine fuel system having a "G" load compensator valve embodying the invention.

Referring now to the figures in greater detail, FIGURE 1 illustrates a gas turbine engine 10 having a source of fuel including a pressurized fuel tank 12 and a tank pressure regulator valve 14, for controlling the pressure of air supplied by the engine. Conduits 16 and 18 communicate between the pressurized fuel tank 12 and the fuel discharge nozzles 13 located in the engine 10, and the "G" loading compensator valve 20 is inserted in series in the fuel feed line made up of conduits 16 and 18.

Figure 2:
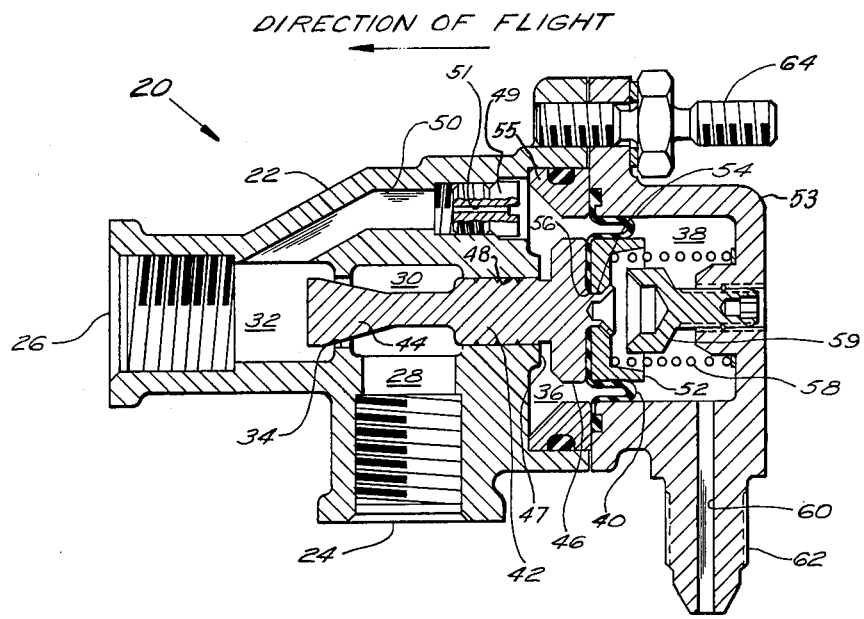
FIGURE 2 is an enlarged cross-sectional view of the "G" load compensator valve shown in FIGURE 1; and, FIGURE 3 is a schematic illustration of the valve shown by FIGURE 2.

As illustrated in FIGURE 2, the compensator valve 20 may comprise a two-piece housing 22 having an inlet 24 and an outlet 26 suitably connected to conduits 16 and 18, respectively, of FIGURE 1. A passageway 28 communicates between the inlet 24 and a chamber 30, and another chamber 32 communicates with the outlet 26. An opening 34 provides communication between chambers 30 and 32.

The housing 22 further includes chambers 36 and 38 and a diaphragm 40 forming a movable wall therebetween. A valve assembly 42, having a suitably contoured end 44 co-operating with the opening 34 and a flanged end 46 adjacent the diaphragm 40, is slidably mounted in an opening 48 between the chambers 30 and 36, the latter having a forward wall 47. A passageway 50 communicates between the chamber 32 and the chamber 36. Should the valve 44 be found to react too quickly, a plug 49 having a calibrated restriction 51 may be inserted in the passageway 50.

A spring seat 52 is secured to an extension 54 of the flanged end 46 through a center opening 56 in the diaphragm 40 in a manner to confine the center of the diaphragm 40 between spring seat 52 and the flanged end 46, the periphery of the diaphragm being clamped between the cover 53 and a ring 55. A spring 58 is confined at its one end by a wall of the chamber 38 and at its other end by the spring seat 52. An adjustable stop 59 may be located in the chamber 38 in order to prevent the valve 44 from ever closing completely for any reason.

An outlet passageway 60 communicates between the chamber 38 and the atmosphere surrounding the two-piece housing 22. In the event the housing 22 is mounted in an unsuitable atmosphere, such as in a chamber of the gas turbine engine 10 which is affected by ram pressure, external threads 62 may be provided to receive a fitting and a conduit (not shown) leading to a suitable external atmosphere. If desired, the housing 22 may include suitable mounting lugs 64.

Operation

Figure 3:
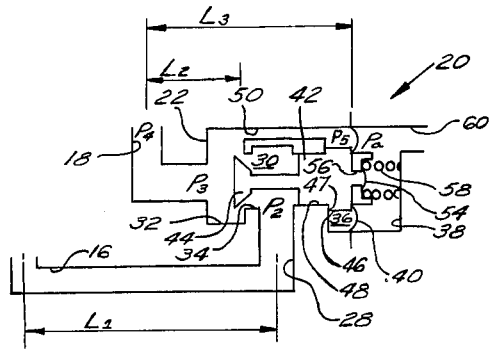

The operation of the dynamic load fuel compensator 20 can best be explained by referring to the schematic illustration of FIGURE 3. If a missile powered by the gas turbine engine 10 were standing still or moving at a constant speed, the valve 44 would remain fully open because the force of the spring 58 against the spring seat 52 is sufficient to hold the flange 46 against the forward wall 47 of the chamber 36. In this state, pressure $P_4$ at the upstream side of the discharge nozzle 13 would be the same as the regulated pressure $P_1$ of the fuel as it leaves the pressurized fuel tank 12, if line loss is neglected.

If no valve 44 is present and the missile is accelerating, the "G" loading effect on the fuel flowing through the relatively long conduit 16 and thence through the conduit 18 will cause pressure $P_4$ to increase. As previously mentioned, the engine pressure downstream of the nozzle 13 remains at ambient pressure $P_a$; hence, an increased pressure drop $P_4-P_a$ would exist across the nozzle 13. This increased pressure differential would cause an increased fuel flow through the nozzle 13, resulting in the engine overspeeding or overheating.

The above described excessive pressure and flow caused by the effect of acceleration is eliminated by the use of the dynamic load fuel compensator 20 between the conduits 16 and 18, the direction of flight in FIGURES 1–3 being from right to left. $P_2$ designates the increased pressure at the inlet passageway 28 which results from the "G" loading on the fuel flowing through that portion of conduit 16 that is parallel with the direction of flight. When $P_2$ increases due to acceleration, pressure $P_3$ in the chamber 32 and pressure $P_5$ in the chamber 36 will also increase. This causes the diaphragm 40 and everything connected thereto, including valve 44, to move to the right in FIGURE 3 against the forces of the spring 58 and the ambient pressure $P_a$ in the chamber 38 on the diaphragm. The result is a decrease in the flow area between the opening 34 and the valve 44. Consequently, pressure $P_3$ in the chamber 32 will be reduced, as will pressure $P_5$ in the chamber 36. The reduction in these pressures will continue until the force due to the pressure differential, $P_5-P_a$, across the diaphragm 40 equals the force of the compressed spring 58, at which time the pressure $P_4$ and fuel flow through the nozzle will be free of the effect of "G" loading.

The various design factors of the valve assembly shown by FIGURE 2, such as the initial force and rate of the spring 58, the area of the diaphragm 40, the size of the opening 34, the contour and travel of the valve 44 and the direction of flight lengths $L_1$, $L_2$ and $L_3$ (see FIGURE 3), are critical for any given application. "G" loading in the direction of flight length $L_3$ and "G" loading on valve assembly 42 compensates for the increase in the force of spring 58 when it is compressed to prevent the increased force from causing an increased fuel flow past the valve 44. While this is not deemed necessary, it can be shown by computation that the valve structure disclosed will perform its intended function, over a range of fuel flows, when these various design factors are properly selected. In fact, this structure has been built and operated successfully.

It is apparent from the above description that the invention provides a novel valve structure capable of eliminating "G" loading effects in a fuel or other fluid supply system.

While but one embodiment of the invention has been disclosed and described, other modifications thereof are possible within the scope of the appended claim.

What we claim as our invention is:

A dynamic load fuel compensator, comprising a housing having an inlet, an outlet, a first passageway therebetween, valve means in said first passageway, a source of fuel under constant pressure, a first conduit communicating between said source of fuel and said inlet, a fuel discharge nozzle, a second conduit communicating the pressure upstream of said outlet to said discharge nozzle and means operatively associated with said valve means, for maintaining the fuel flow therepast constant and for eliminating the effect of dynamic loading on the fuel flowing between said source and said discharge nozzle, said means including first and second chambers formed in said housing, pressure responsive means fixedly secured to said valve means and forming a movable wall between said first and second chambers, resilient means in said first chamber, an outlet to the atmosphere formed in said first chamber and a second passageway communicating between said first passageway and said second chamber in order that the pressure differential across said pressure responsive means may balance the force of said resilient means portions of said first and second conduits, said second passageway and the axis of said valve being parallel to each other and to the direction in which the dynamic loading is applied.

References Cited by the Examiner

UNITED STATES PATENTS

| | | | |
|---|---|---|---|
| 646,428 | 4/1900 | Hardie | 137—505.18 X |
| 2,343,375 | 3/1944 | Herman | 137—505.26 X |
| 2,795,106 | 6/1957 | Martin | 158—36 X |
| 2,827,762 | 3/1958 | Towns | 60—35.6 X |
| 3,015,210 | 1/1962 | Williamson et al. | 60—35.6 X |
| 3,137,128 | 6/1964 | Francais et al. | 60—35.6 |
| 3,174,280 | 3/1965 | Ackland et al. | 60—39.28 |

FREDERICK KETTERER, *Primary Examiner.*